(12) United States Patent
Beneker et al.

(10) Patent No.: US 7,677,520 B2
(45) Date of Patent: Mar. 16, 2010

(54) LONGITUDINAL GUIDE FOR AN AUTOMOTIVE VEHICLE SEAT

(75) Inventors: Wilfried Beneker, Cologne (DE); Burckhard Becker, Cologne (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 128 days.

(21) Appl. No.: 11/124,754

(22) Filed: May 9, 2005

(65) Prior Publication Data

US 2005/0285008 A1    Dec. 29, 2005

(30) Foreign Application Priority Data

Jun. 24, 2004    (DE) ........................ 10 2004 030 686
Dec. 20, 2004    (DE) ........................ 10 2004 061 140

(51) Int. Cl.
*F16M 13/00*    (2006.01)

(52) U.S. Cl. ........................ 248/430; 248/424; 248/429; 297/344.1; 297/344.11; 296/65.14

(58) Field of Classification Search ................. 248/424, 248/429, 430; 297/344.1, 344.11; 296/65.14
See application file for complete search history.

(56) References Cited

U.S. PATENT DOCUMENTS

| | | | | |
|---|---|---|---|---|
| 3,355,211 | A * | 11/1967 | Kolle ........................ 296/65.14 |
| 3,926,397 | A * | 12/1975 | Hunwicks ................... 248/430 |
| 4,602,758 | A * | 7/1986 | Mann et al. ................. 248/430 |
| 4,720,073 | A * | 1/1988 | Mann et al. ................. 248/430 |
| 4,852,846 | A * | 8/1989 | Weier ......................... 248/430 |
| 4,863,289 | A | 9/1989 | Lecerf |
| 4,901,421 | A * | 2/1990 | Takarabe et al. ............... 29/437 |
| 5,219,230 | A * | 6/1993 | Babbs .......................... 384/47 |
| 5,407,166 | A * | 4/1995 | Pilarski ...................... 248/430 |
| 5,813,648 | A * | 9/1998 | Moradell et al. ............. 248/424 |
| 5,938,164 | A * | 8/1999 | Kargol et al. ................ 248/429 |
| 5,941,495 | A * | 8/1999 | Bauer et al. .................. 248/430 |
| 5,961,089 | A * | 10/1999 | Soisnard ...................... 248/430 |
| 5,984,254 | A * | 11/1999 | Baloche et al. .............. 248/430 |
| 6,012,695 | A * | 1/2000 | Bauer et al. .................. 248/430 |
| 6,036,157 | A * | 3/2000 | Baroin et al. ................ 248/429 |
| 6,059,248 | A * | 5/2000 | Bauer et al. .................. 248/430 |
| 6,059,345 | A * | 5/2000 | Yokota ..................... 296/65.14 |

(Continued)

FOREIGN PATENT DOCUMENTS

DE    3143431 C2    9/1988

(Continued)

*Primary Examiner*—J. Allen Shriver, II
*Assistant Examiner*—Michael McDuffie
(74) *Attorney, Agent, or Firm*—McCarter & English, LLP

(57) ABSTRACT

The invention relates to a longitudinal guide for an automotive vehicle seat with a surrounding rail (20), a surrounded rail (50), a free longitudinal channel (72) being formed between said rails and a first lateral encompassing area (68) and a second lateral encompassing area (70) located diagonally opposite said first lateral encompassing area being provided, with said surrounding rail (20) forming an outer grip around said surrounded rail (50) and the roll bodies (73-75) being disposed in a respective one of said areas, with guide channels for the roll bodies (73-75) being formed between the rails in the encompassing areas (68, 70). One guide channel (76) only is formed in the first encompassing area (68) while two guide channels (77, 78) are formed in the second encompassing area (70).

17 Claims, 4 Drawing Sheets

U.S. PATENT DOCUMENTS

Figure 1:
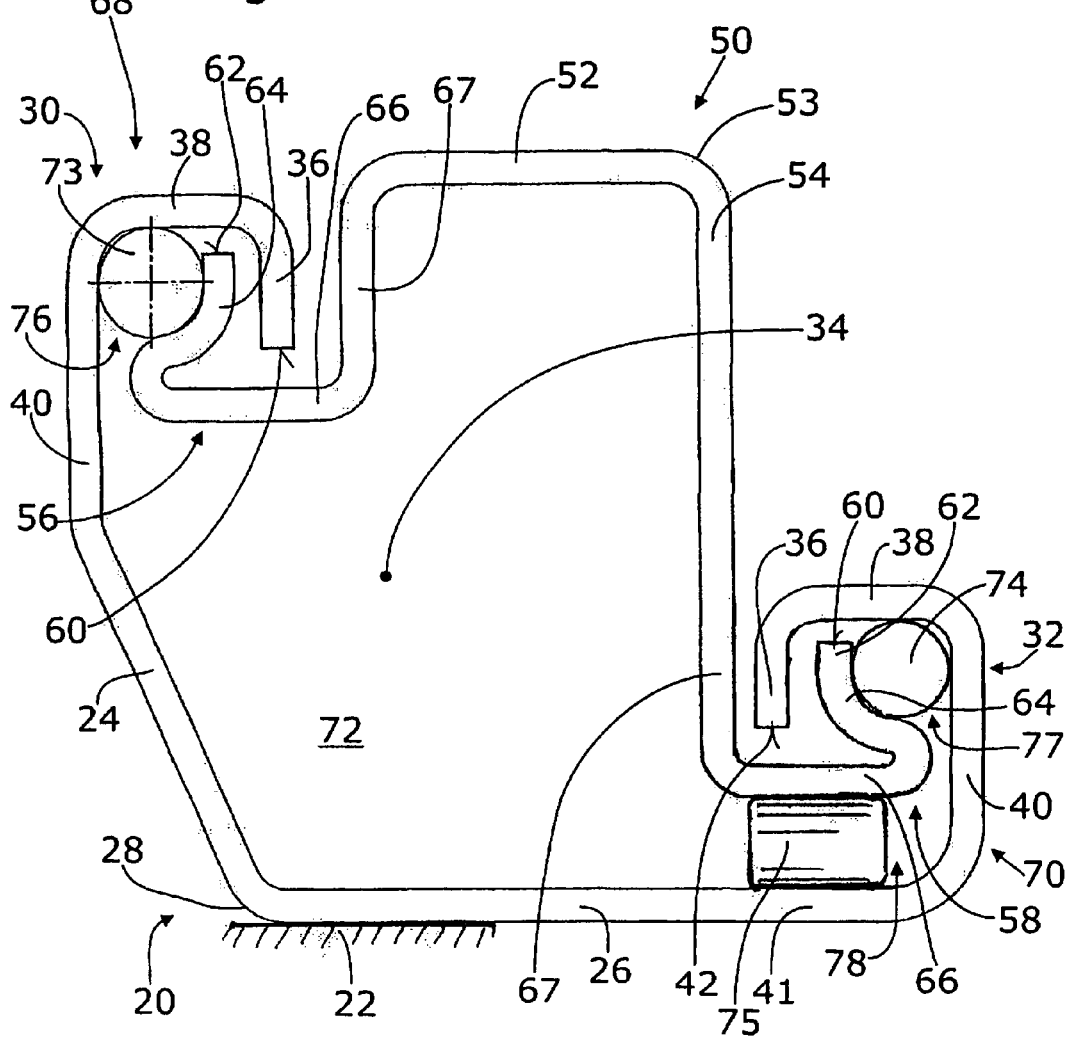

| | | | |
|---|---|---|---|
| 6,079,688 A * | 6/2000 | Levillain et al. | 248/429 |
| 6,098,946 A * | 8/2000 | Sechet et al. | 248/424 |
| 6,109,584 A * | 8/2000 | Garrido | 248/429 |
| 6,152,415 A * | 11/2000 | Seki et al. | 248/430 |
| 6,427,962 B1 * | 8/2002 | Rohee et al. | 248/424 |
| 6,676,099 B2 * | 1/2004 | Mallard et al. | 248/429 |
| 6,688,574 B2 * | 2/2004 | Okazaki et al. | 248/424 |
| 2001/0006209 A1 * | 7/2001 | Yoshida et al. | 248/429 |
| 2003/0168567 A1 * | 9/2003 | Klahold et al. | 248/429 |

FOREIGN PATENT DOCUMENTS

| | | |
|---|---|---|
| DE | 198 12 045 A1 | 9/1999 |

* cited by examiner

LONGITUDINAL GUIDE FOR AN AUTOMOTIVE VEHICLE SEAT

This application claims the benefit of German Patent Application No. 102004030686.9, filed Jun. 24, 2004, and German Patent Application No. 102004061140.8, filed Dec. 16, 2004, the contents of which are hereby incorporated by reference in their entireties.

The invention relates to a longitudinal guide for an automotive vehicle seat. The longitudinal guide has a surrounding rail, a surrounded rail and roll bodies disposed between said rails. A free longitudinal channel is formed between said rails. There are provided a first lateral encompassing area and a second lateral encompassing area located diagonally opposite said first lateral encompassing area, the surrounding rail forming an outer grip around the surrounded rail and the roll bodies being disposed in a respective one of said areas, guide channels for the roll bodies being formed between the rails in the encompassing areas only.

Such a longitudinal guide is known from U.S. Pat. No. 6,059,248. In each of the two diagonally opposite encompassing areas there are formed two guide channels for roll bodies that are each configured to be balls. The longitudinal channel has quite large dimensions and is therefore advantageously suited for mounting add-on units such as an electric drive or a catch device therein. This longitudinal guide has also proved efficient in practical use; it exhibits good gliding properties and resists being pulled out when subjected to crash loads. The resistance against being pulled out is ensured by the clutch provided in the encompassing areas. Generally, the top rail is the surrounded rail and the bottom rail, which may be connected to a floor region of an automotive vehicle, the surrounding rail.

Similar rail profiles having four guide channels are known from U.S. Pat. No. 4,863,289 and from U.S. Pat. No. 5,984,254.

The longitudinal guides of the type mentioned herein above as described in the document DE 31 43 431 C2 are easier to make. In these guides, but one guide channel is provided in each of the two diagonally opposite encompassing areas. With such type longitudinal guides, it is easier to keep all the roll bodies in the guide channels in constant contact with both rails. This is possible by having the surrounded rail biased and moving resiliently outward whilst the surrounding rail is configured to be its counterpart.

It is the object of the invention to improve the prior art longitudinal guide for an automotive vehicle seat. It aims at keeping, as far as practicable, the advantages of four ball profiles, more specifically the good gliding properties thereof, while exploiting the easier make of two ball profiles. Loads exerted in operation, for example by a passenger, are to be absorbed directly and suitably with all of the roll bodies precisely contacting both rails, even if the vehicle seat is not loaded. This object is solved by a longitudinal guide for an automotive vehicle seat with a surrounding rail, a surrounded rail and roll bodies disposed between said rails, a free longitudinal channel being formed between said rails, a first lateral encompassing area and a second lateral encompassing area located diagonally opposite said first lateral encompassing area being provided, with said surrounding rail forming an outer grip around said surrounded rail and said roll bodies being disposed in a respective one of said areas, guide channels for the roll bodies being formed between said rails in said encompassing areas, wherein one guide channel only is formed in said first encompassing area and that two guide channels are formed in said second encompassing area.

In this longitudinal guide, one of the two encompassing areas is provided with but one guide channel whereas the other encompassing area comprises two guide channels. This results in a readily manufacturable longitudinal guide that avoids the drawbacks of the ball profile and has improved properties over the two ball profile.

In a particularly advantageous configuration, the encompassing area comprising the two guide channels is disposed at the bottom while the other encompassing area with but one guide channel is located at the top. The lower encompassing area is preferably devised for receiving loads, meaning more specifically an occupant's weight. A lowermost guide channel is provided for this purpose. From all of the three guide channels, it is the one which is located lowest. It may preferably be equipped with rolls or cylinders. These are capable of sustaining higher loads than balls. By contrast, the other two guide channels are preferably fitted with balls.

In a preferred embodiment, the surrounding rail is a bottom rail and the surrounded rail a top rail. Preferably, the top rail may be composed of two single profiles as this is known from U.S. Pat. No. 6,059,248.

Preferably, the roll bodies of at least one guide channel of the encompassing area having two guide channels and the roll bodies of the other encompassing area lie in their respective guides thanks to the bias of the rails. Under the weight load, which is also present when the vehicle seat is not occupied, the roll bodies of the lowermost guide channels preferably rest against the two rails. This permits to ensure good contact between the respective one of the roll bodies and the rails, even in the long run.

Figure 2:
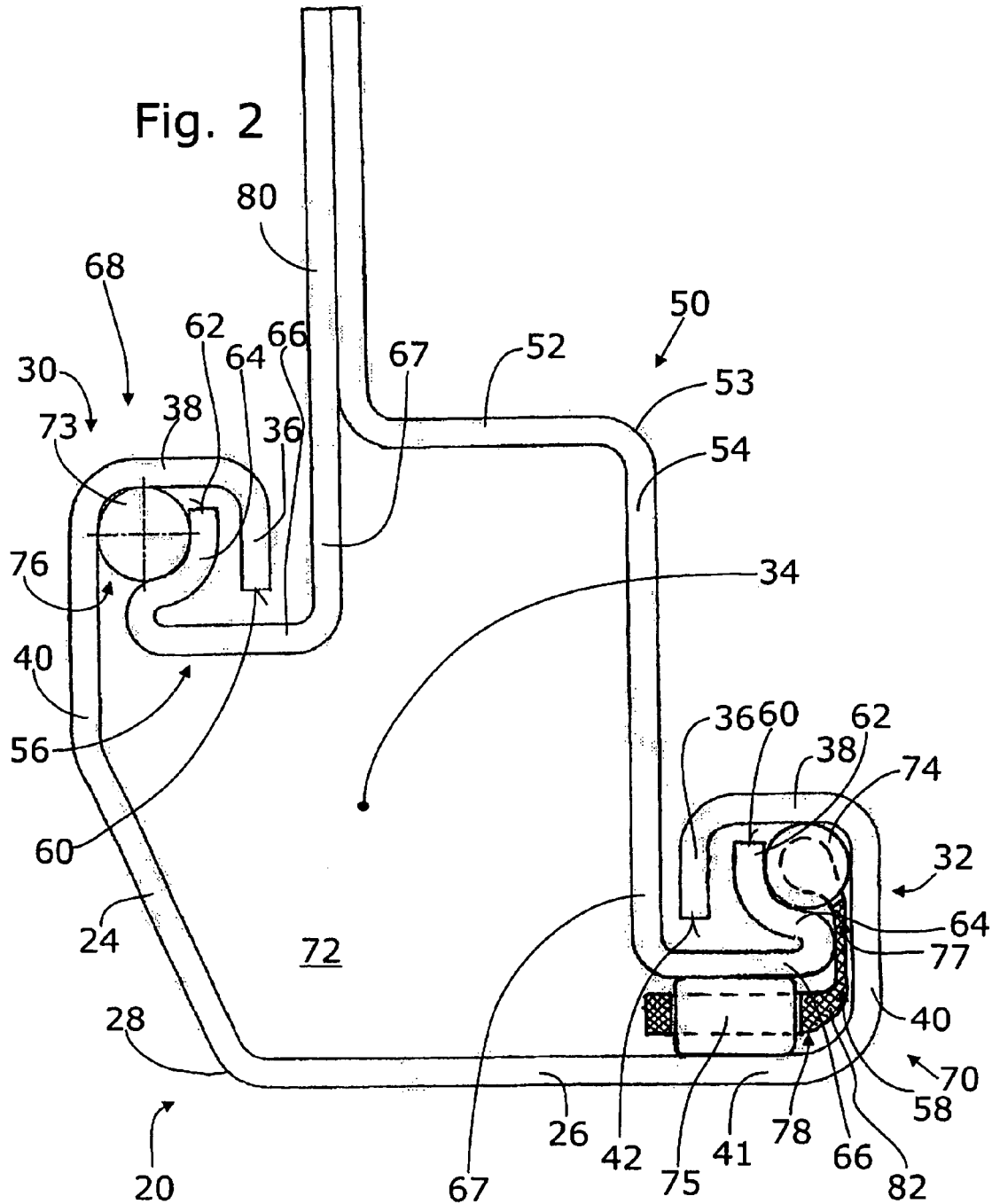
Figure 3:
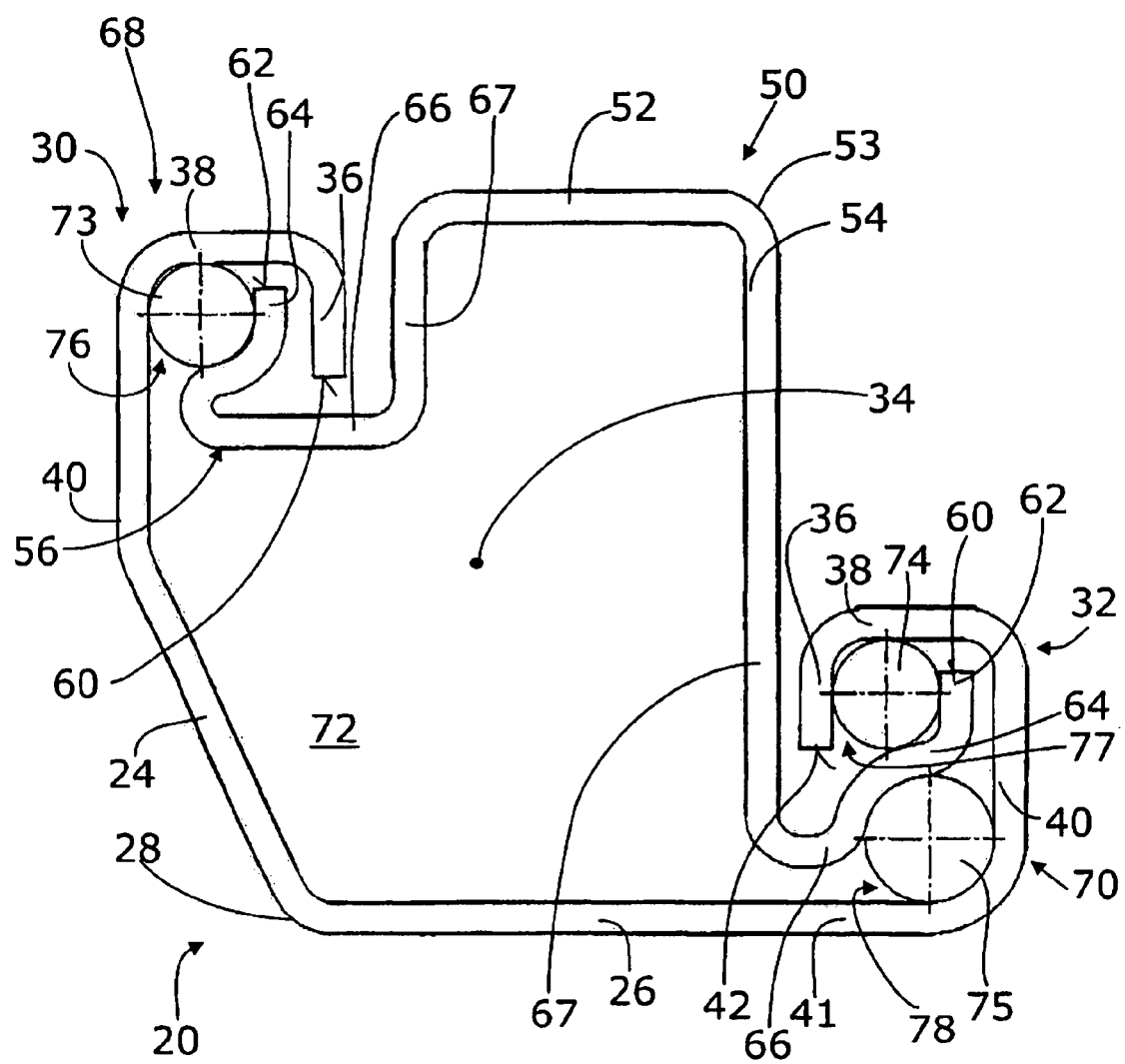
Figure 4:
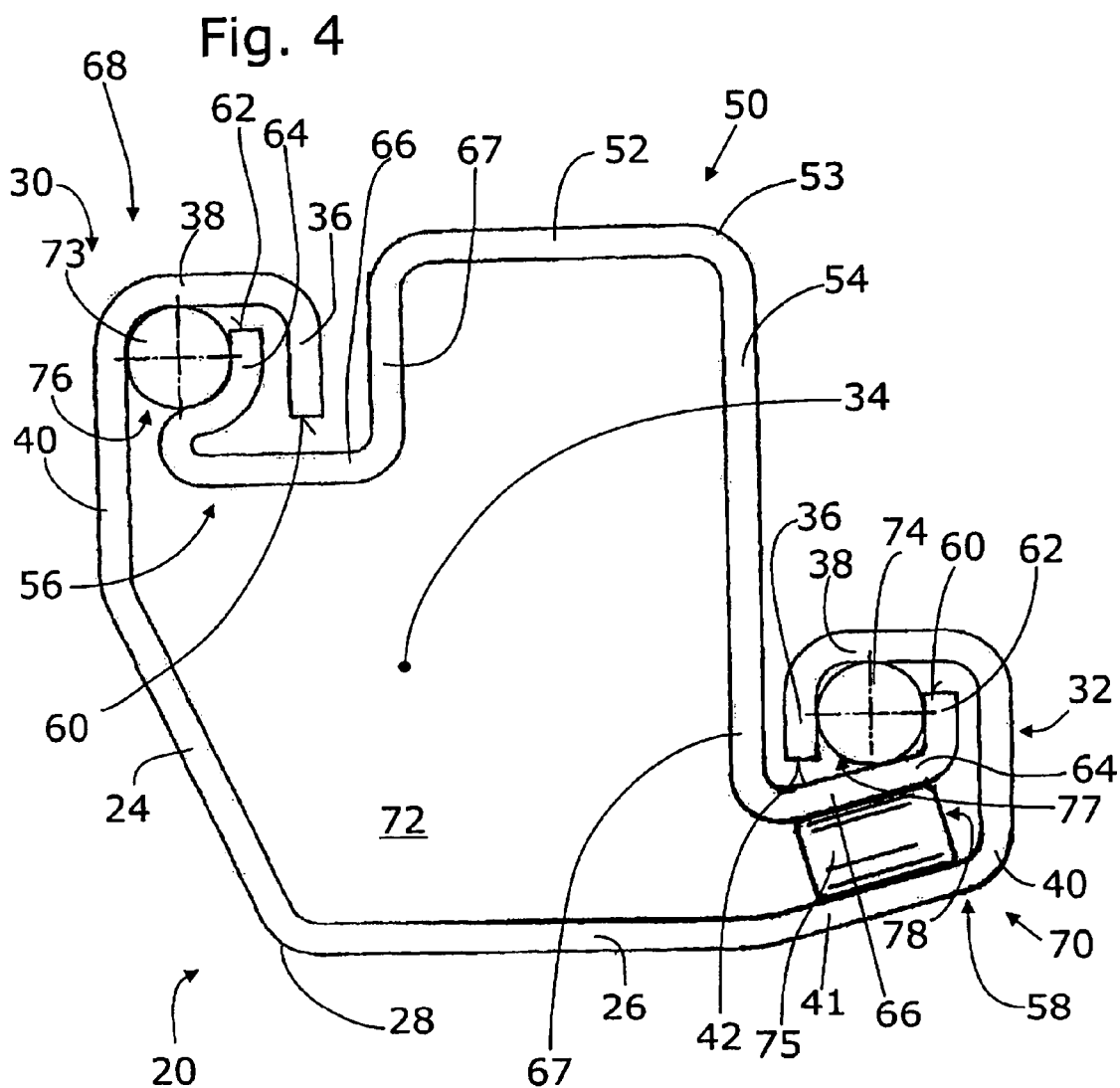

Other features and advantages will become more apparent upon reviewing the appended claims and the following non restrictive description of embodiments of the invention, given by way of example only with reference to the drawing. In said drawing:

FIG. 1: shows a first exemplary embodiment as viewed in the direction of a longitudinal axis and into the longitudinal channel thereof, FIG. 2: is an illustration like FIG. 1 but this time for a second exemplary embodiment with a cage being additionally provided in the bottom encompassing area, FIG. 3: is an illustration like FIG. 1, only balls having been employed this time as the roll bodies, and FIG. 4: is an illustration like FIG. 1, this time with another configuration of the lower encompassing area.

As known, the longitudinal guide has a surrounding rail 20 which, in the exemplary embodiments, always is the bottom rail. In the mounted state, it is connected to an underbody 22. In the mounted state, said underbody 22 is located at the bottom so that the illustration in all the FIGS. corresponds to the mounted state and that "bottom" and "top" will be used as references herein after.

The surrounding rail 20 has an L-shaped region with two legs 24, 26 which are taking departure from a corner 28. The angle between the two legs 24, 26 usually ranges between 90 and 130 degrees; in the embodiment as shown, it is approximately 115°. The legs 24, 26 are adjoined with encompassing zones 30, 32. In said zones, the metal sheet of the rail 20 is angled inward several times, at least twice, with the bending being each time performed inward in parallel to a longitudinal or central axis 34. In the exemplary embodiments, there are at least two respective 90 degree bends. Each encompassing zone 30, 32 has an end flange 36 and an adjoining partially enclosing flange 38 which in turn is adjoined with a side flange 40. Said flanges 36-40 are respectively inclined to each other at an angle of 90 degrees. The end flanges 36 have free ends 42, 60 that are pointed downward, meaning to the underbody 22. This occurs at right angles.

The surrounded rail 50 also has an L-shaped region with two legs 52, 54 which, in the exemplary embodiments are always inclined to each other with an angle of 90 degrees. They take departure from a corner 53 which is located diagonally opposite corner 28. Again, said legs 52, 54 are adjoined with encompassing zones 56, 58 which end at a free end 60. In all of the exemplary embodiments, said free end 60 is directed upward, more specifically perpendicularly upward, and, as a result thereof, in a direction exactly counter to the direction of the free end 42 of surrounding rail 20. Each of the encompassing zones 56, 58 has an end flange 62, a guide flange 64, which is adjoined with said end flange and is curved about a radius, and a base flange 66. The surrounding rail 20 additionally has a lower flange 41 in the right second encompassing zone 32, which is also located lower. In said encompassing zone 32, said lower flange connects the second leg 26 to the side flange 40. In each encompassing zone 56, 58, the surrounded rail 50 has an inner flange 67 that connects the respective one of the legs 52, 54 to the respective base flange 66.

The encompassing zones 30, 32 and 56, 58 are each substantially U-shaped. The encompassing zones 30, 32 of the surrounding rail 20 are open toward the bottom; the encompassing zones 56, 58 of the surrounded rail are open toward the top. The encompassing zone 30 and the encompassing zone 56 are interengaged with the same applying to the second encompassing zone 32 that is interengaged with the second encompassing zone 58 of the surrounded rail 50. It is well known that this makes it difficult to separate the two rails 20, 50.

The interengaged encompassing zones 30, 56 and 32, 58 form a first encompassing area 68 which in all of the exemplary embodiments is located on the left and also at the top and a second encompassing area 70 which in all of the exemplary embodiments is located on the right and also at the bottom. The left and right arrangement may be interchanged by simply arranging them in a mirror-inverted fashion. The top and bottom arrangement however is advantageous; although it may be implemented differently, this form has proved efficient. The two encompassing areas 68, 70 are located diagonally opposite one another. Together with the two L-shaped regions 30, 32 and 52, 54, they define a longitudinal channel 72. Each encompassing area 68, 70 has a surface which is considerably smaller than the free surface of the longitudinal channel 72 as viewed from the side and as shown in all of the FIGS. The surface is at least four times smaller.

In the upper encompassing area 60, a rounded inner corner located between the partially enclosing flange 38 and the side flange 40 forms a concave guide groove for roll bodies 73 configured in the shape of balls. Also, the guide flange 64 forms a confronting guide groove for said roll bodies 73, said guide groove being parallel to the diagonal direction. Together, the two guide grooves form a guide channel 76 for the roll bodies 73. It can be seen that the roll bodies 73 are mounted substantially parallel to a diagonal direction. The L-shaped region 24, 26 of the surrounding rail 20 and/or the L-shaped region 52, 54 of the surrounded rail 50 act like a leg spring. A respective one of the legs 52 and 54 of the surrounded rail 50 thereby executes a resilient movement outward about corner 53 and/or the legs 24 and 26 of the surrounding rail 20 execute a resilient movement inward about corner 28.

In the lower encompassing area 70 there are provided two guide channels 77, 78 for roll bodies 74 and 75 that will be discussed in greater detail herein after. Again, in an inner corner between the surrounding flange 38 and the side flange 40 there is formed a guide groove; opposite said guide groove there is located a guide groove formed by the concave end flange 64 that is offset by 90 degrees with respect to the only guide channel 76 of the first encompassing area 68. These two guide grooves form an upper guide channel 77 in the lower encompassing area 70. A lower guide channel 78 forms the second guide channel of said encompassing area 70. The roll bodies 75 are disposed therein between an upper and a lower part and are thus disposed directly in the direction of the load, at least preferably in the direction of the load. It is devised in such a manner that a weight load applied on the top rail 50 is directly absorbed and will substantially not influence the bias causing the two rails 20, 25 to rest against each other. Exactly the opposite applies to the two other guide channels. There, the bias urges the roll bodies 73, 74; a weight load applied on the seat influences the bias. In accordance with its load-carrying function the lower guide channel 78 preferably accommodates rolls 75, as this is shown in a plurality of exemplary embodiments. This however must not be so, see FIG. 3.

The differences between the various exemplary embodiments will be discussed herein after:

As shown in FIG. 2, the top rail 50 may be composed of two single profile pieces so that a fastening flange 80 is formed to which superstructures such as a seat frame may be affixed. It applies in principle and in particular to all of the exemplary embodiments that the top rail 50 may be composed of two profile pieces, as shown in FIG. 2. In FIG. 2, the roll bodies 74, 75 of the lower encompassing area 70 are additionally held together and guided by a cage 82. Usually, two roll bodies 73-75 are provided for each guide channel. Further, in the FIGS. 1, 2 and 4, the roll bodies 75 of the lower guide channel 78 are implemented as rolls whereas in FIG. 3 they are configured to be balls. In the FIGS. 3 and 4, the roll bodies 74, 75 of the two guide channels 77, 78 in the lower encompassing area 70 lie on different sides of the encompassing zone 58 whilst in the FIGS. 1 and 2 said roll bodies 74, 75 lie on the same side of said encompassing zone 58, namely on the outer side thereof. In the embodiments as shown in the FIGS. 1 and 2, the top rail 50 lies between the roll bodies 73, 74 whereas in the configuration as shown in the FIGS. 3 and 4 said roll bodies 73, 74 are each located on the same side of the end flange 62.

The exemplary embodiments as shown in the FIGS. 3 and 4 differ from the other exemplary embodiments in the following respects: the bias provided in at least one rail does not act onto the roll body 74 of the upper guide channel 77 but onto the roll body 75 of the lower guide channel 78, which in FIG. 4 is configured to be a roll. In FIG. 4, the lower flange 41 is inclined upward at an angle of about 10 to 20° with the horizontal or the second leg 26 respectively. A support for the bias is thus provided. The base flange 66 is oriented in the same manner and in parallel in said encompassing area 70.

The invention claimed is:

1. A longitudinal guide for an automotive vehicle seat comprising:

a surrounding rail defining a profile, a surrounded rail and roll bodies disposed between the rails;

a free longitudinal channel being formed between the rails;

a first lateral encompassing area and a second lateral encompassing area located diagonally opposite the first lateral encompassing area being provided, with the surrounding rail forming an outer grip around the surrounded rail and the roll bodies being disposed in a respective one of the areas; and guide channels for the roll bodies being formed between the rails in the encompassing areas, wherein one guide channel only is formed in the first encompassing area, two guide channels are formed in the second encompassing area, and in the mounted state, the second encompassing area is located lower than the first encompassing area, and the profile of the surrounding rail (i) forms at least one outer corner that is located in the second encompassing area, an inner curve mates with the outer corner formed on the inner side of the profile and the inner curve forms a guide groove for a roll body, and (ii) comprises an enclosing flange, a lower leg and a lower flange extending generally in the direction of the lower leg, the lower flange has a lower flange length and delimits a lower guide channel of the two guide channels of the second encompassing area and is in contact with a lower roll body of the second encompassing area, the lower roll body of the second encompassing area is realized as a roll, the roll has an axial length, the axial length of the roll is smaller than the lower flange length, the enclosing flange runs substantially parallel to the lower leg and has an inner surface, the inner surface delimits an upper guide channel of the two guide channels of the second encompassing area and the inner surface is in contact with an upper roll body of the second encompassing area, and the upper roll body of the second encompassing area is realized as a sphere.

2. The longitudinal guide as set forth in claim 1, wherein the surrounded rail has two end flanges and that at least one of the two end flanges of the surrounded rail is oriented vertically and has a free end that is directed upward when mounted.

3. The longitudinal guide as set forth in claim 1, wherein the surrounding rail has two end flanges and that at least one of the two end flanges of the surrounding rail is oriented vertically and has a free end that is directed downward when mounted.

4. The longitudinal guide as set forth in claim 1, wherein the surrounded rail has two end flanges, that a roll body rests against at least one of the two end flanges and that at least one roll body rests on the outer side of a respective one of the end flanges.

5. The longitudinal guide as set forth in claim 1, wherein at least one roll body rests both against an outer surface of an end flange of the surrounded rail and against an inner surface of an end flange of the surrounding rail.

6. The longitudinal guide as set forth in claim 1, wherein the two rails comprise encompassing zones encompassing their profile, that the encompassing zones belong to the encompassing areas, and that a substantially L-shaped region is located between the encompassing zones of each rail.

7. The longitudinal guide as set forth in claim 1, wherein the two rails comprise encompassing zones encompassing their profile, that the encompassing zones of the surrounding rail are angled at least twice in the same direction and parallel to a central axis.

8. The longitudinal guide as set forth in claim 1, wherein the profile of the surrounding rail forms at least one outer corner that is located in the first encompassing area, that an inner curve mates with the outer corner formed on the inner side of the profile and that the inner curve forms a guide groove for a roll body.

9. The longitudinal guide as set forth in claim 1, wherein in the second encompassing area the two guide channels for the roll bodies are located on different sides of the surrounded rail.

10. The longitudinal guide as set forth in claim 1, wherein in the second encompassing area having the two guide channels a lower guide channel is defined by a portion of the surrounded rail that rests from the top against the roll bodies of the guide channel and by a portion of the surrounding rail that is located beneath the roll bodies of the guide channel and that in an upper guide channel of the encompassing area the surrounding rail partially encloses the roll bodies of the encompassing area.

11. The longitudinal guide as set forth in claim 1, wherein in the first encompassing area having only one guide channel the surrounding rail partially encloses the roll bodies of the guide channel.

12. The longitudinal guide as set forth in claim 1, wherein in the second encompassing area having the two guide channels a lower guide channel comprises rolls as the roll bodies.

13. The longitudinal guide as set forth in claim 1, wherein in the encompassing area there is provided a lower flange that is inclined at an angle to the second leg.

14. The longitudinal guide as set forth in claim 1, wherein the profile of the surrounded rail forms a base flange that is located in the second encompassing area, the base flange is in contact with the roll and runs parallel to the lower flange.

15. The longitudinal guide as set forth in claim 1, wherein the profile of the surrounded rail forms a base flange that is located in the second encompassing area, the base flange is in contact with the roll and has a base flange length, and the axial length of the roll is smaller than the base flange length.

16. The longitudinal guide as set forth in claim 1, wherein the profile of the surrounded rail forms a base flange that is located in the second encompassing area, and the base flange is parallel to the lower flange.

17. The longitudinal guide as set forth in claim 7, wherein the encompassing zones are angled at about 90 degrees each.

* * * * *